Nov. 22, 1960

J. BATES 2,961,195

THERMAL BARRIER AIRFOIL

Filed Aug. 5, 1957

INVENTOR

John Bates

Nov. 22, 1960  J. BATES  2,961,195
THERMAL BARRIER AIRFOIL
Filed Aug. 5, 1957  2 Sheets-Sheet 2

INVENTOR
John Bates

United States Patent Office 2,961,195
Patented Nov. 22, 1960

2,961,195

THERMAL BARRIER AIRFOIL

John Bates, 313 W. Central, Anadarko, Okla.

Filed Aug. 5, 1957, Ser. No. 676,130

3 Claims. (Cl. 244—42)

This invention relates to aircraft whose flight velocities are intended for the hypersonic regimes or perhaps at, or beyond the thermal barrier, where the heating effect is the main deterrent to this type of flights. It has been said, the heating effect of hypersonic flights is from the viscous properties of the air; hereinafter referred to as friction.

It has been said, the resultant effect of friction in the airflow is stagnation. Where stagnation occurs in the airflow, the density of the airflow is increased from density one (1) to density two (2), where density two (2) is greater than density one (1).

By observation, this indicates there is an enormous amount of compression in the airflow over the slopes of a high speed airfoil section, at a velocity above the transonic range, even though the airfoil is very thin.

Evidently part of the thermal energy imparted to the airflow is from compression, although it has been said, the heating of the airfoil and airflow is from friction of the airflow on the airfoil skin. It seems compression in the airflow has been neglected. It is well known when air is compressed, thermal energy is added or heat is increased.

In the long run, high speeds are the prime commodities of air power and enormous amounts of energy are required to obtain them. But as air speeds increase, the airfoils are reduced in length and thickness. It is then difficult to develop sufficient lift at low aircraft speeds without adding devices which have high drag forces.

To avoid using these devices, as they are difficult to apply on thin airfoils, the angle of the attack must be high which, in itself, introduces a drag factor of a magnitude which is sometimes critical in the landing and take-off regimes. This perhaps, is the reason for the high landing and take-off speeds and the requirement for extra long runways for supersonic aircraft.

In the past, and perhaps now, in the development of airfoils, there has been a waste of propulsion energy in the form of aerodynamic heating on the airfoil skin. Since it is generally agreed that an object moving through the atmosphere at a high velocity will impart energy to the airflow in front and around the object. However, at supersonic velocities and above, we have an added energy loss, which is said to be thermal energy.

The aerodynamic heat or thermal energy loss at supersonic velocities and above was originally thermal energy expanded through the aircraft's power plant (less heat reject) part of the thermal energy was transformed into mechanical energy by resultant opposite reaction of the aircraft's forward flight, less friction in flight, weight and other losses. At supersonic speeds through friction with the airflow, part of the aircraft's mechanical energy is transformed back into thermal energy, its original state. Up to now, this is a total loss. However, it has been said, there were experiments to re-use this energy loss with boundary layer control but to my knowledge to date were inefficient.

The present invention will provide means to overcome the preceding disadvantages.

The primary object of the present invention is for the said airfoil to operate at, or possibly beyond the thermal barrier.

A further object of the invention is to reduce the increased density and stagnation in the airflow over the said invention through the transonic, hypersonic air speeds and above.

A further object of the invention is to provide a means to cancel part of its own drag by transforming the aerodynamic heating effect, which is said to be thermal energy, into mechanical energy to help propel the aircraft forward, as the aerodynamic heating effect is a total energy loss. This is a further refinement of the ramjet or athodyd type of aircraft engine, appliable to airfoils. Fuel may be burnt within the confines of the airfoil.

A further object of the invention is to provide stability of a large safety factor during landing and take-off stages of flight. It is well known in aeronautics that the stability and high wing loading depends on the depth of the thickness ratio relative to its chordal length, so as to provide means for circulating the airflow as pertaining to subsonic flights.

A further object of the invention is to provide for a wing capable of being an ultra-high speed airfoil and be adaptable to a low velocity, high lift wing section, and the whole main airfoil structure being an unbending stiff device through its chord and length spanwise. The main structure of the airfoil is not bent, drooped, or deflected downward at its leading and trailing edge to increase lift.

A still further object of the present invention relates to a method of assisting the propulsion in one direction of the reaction caused by compressing air by ram effect, and expelling fluid in the opposite direction and is deemed to be particularly adapted for aircraft wings but not necessarily limited to this use; i.e. the extreme ends of the main rotor blades of a helicopter. It can also be actuated into the intermediate positions to compensate the lift in proportion to the variable speeds and varying loads during separate flights.

Other objects and advantages of the device will be noted in the foregoing specification of the invention. However, as this disclosure proceeds, it is to be understood the illustrations and specifications shall not necessarily limit the invention as to construction, scope and method of hinging the lift intensifying devices or actuating mechanisms as defined in the annexed claims.

Referring to the drawings.

Figure 4:
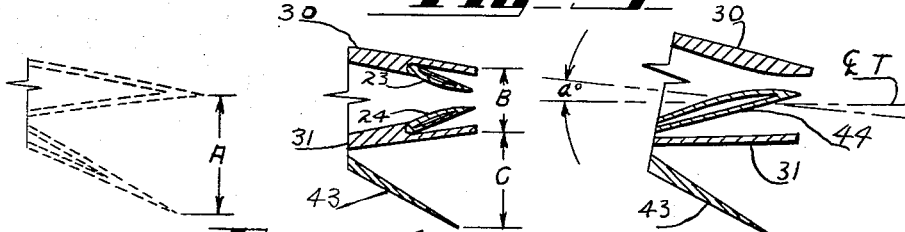

Figure 4 is a fragmentary cross-section of the trailing edge. It is in two parts to show the difference in the induced drag aft of the trailing edge of the airfoils. The left hand view in the broken lines is the trailing edge of a conventional thin high speed airfoil section with the flap deflected downward. The view on the right is of the present invention, with the two internal flaps partly closed and the lower external flap in the downward position. It is obvious area A equals C. The induced drag on the present invention is greater by the area B. The two internal flaps are partly opened as there may be a need to reduce the induced drag B by the amount of airflow between the two internal flaps. This flow may be variable. This will somewhat prevent the separation of the upper airflow over the top of the present invention.

Figure 5:
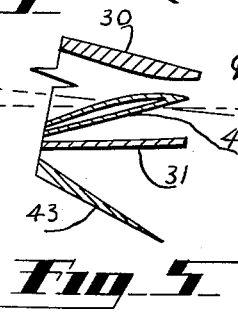

Figure 5 is also a fragmentary cross-sectional view showing only one internal flap hinged to the inner surface of the lower skin, where the present device is set to an angle of incidence to the centerline of flight.

Figure 6:
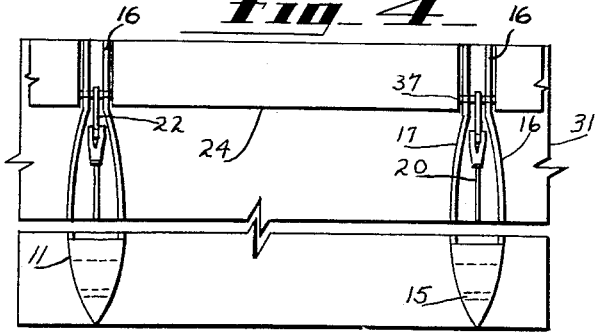

Figure 6 is a fragmentary plan view with the top skin removed to illustrate the enclosure of the mechanisms between the rib plates away from the internal high density airflow.

Figure 7:
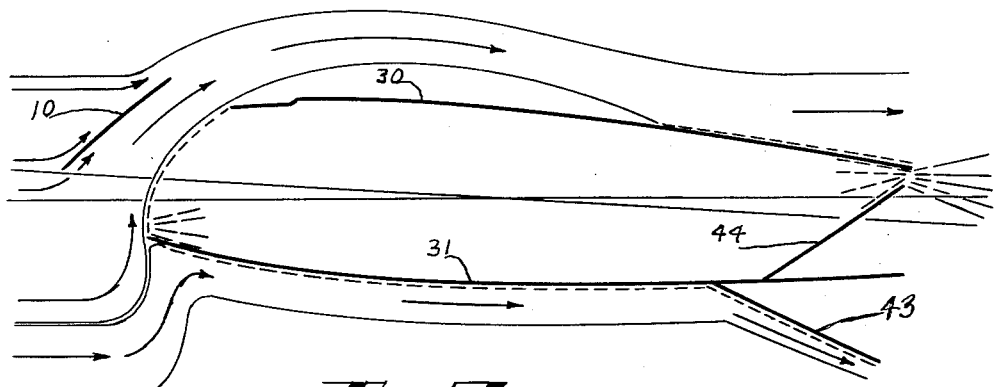

Figure 7 is an illustration of the approximate low velocity, high lift, airflow for landing and initial stages of flights.

Figure 8:
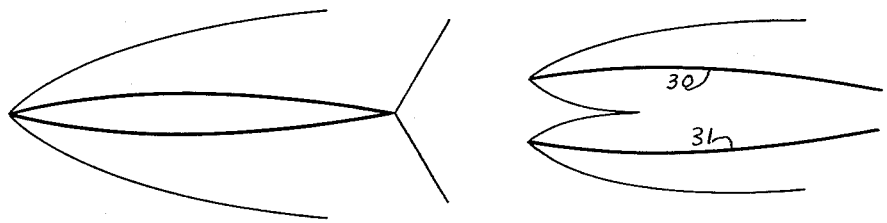

Figure 8 is an illustration of the two different types of airflow over a conventional thin airfoil and the present invention at a velocity of Mach 1.3, or velocity 1. The Mach shock waves are at the leading edges of each airfoil. The Mach shock wave is reduced in an area by the amount of airflow entering the forward opening of the present invention.

Figure 9:
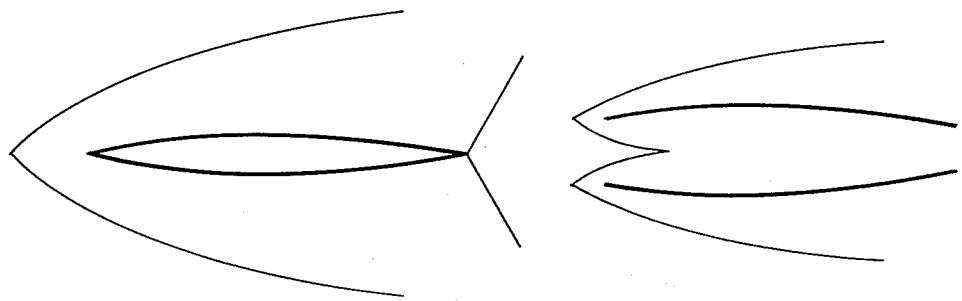

Figure 9 is similar to Figure 8 but at a greater velocity or velocity 2; where velocity 2 is a greater velocity than velocity 1. The Mach shock wave has moved forward from the conventional thin airfoil. The Mach shock wave has moved less distance forward from the present invention by the amount of airflow swallowed through the forward opening. The stagnation is reduced and hence less heat build up over the forward slopes.

Figure 10:

Figure 10 is an illustration of the boundary layer control. As the airflow enters the forward opening of the present invention and is restricted by the aft slopes and smaller opening aft, the density of the airflow is increased and is forced out through the slots in the aft slopes, and being of a higher density it will flow out through the slots without the need for pumping equipment.

Figure 1:
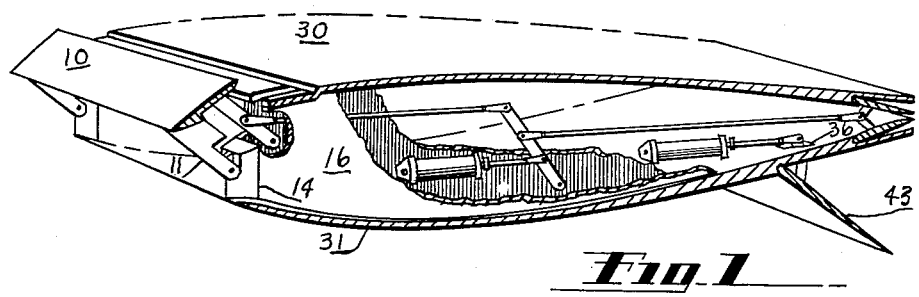
Figure 1 is a perspective illustration of the device in the low velocity, high lift flight position with the slat opened forward and the two internal flaps partly closed and the lower external flap deflected in the downward position. This illustration is for landing and initial stages of flight.

As illustrated in Figure 1 the present invention is an improved airfoil which consists of a main structure with an opening along the leading edge and a smaller, variable opening along the trailing edge. The skins 30 and 31 being formed with a slight convex shape of a rather thick suitable material as they must serve a dual purpose, that of the skin and spars. The upper skin 30 is in two parts, skin 30 and slat 10. The leading edge of the upper skin 30 is set back so when slat 10 is closed, it is a continuation of skin 30 forward. When slat 10 is moved forward skin 30 being set back at its leading edge allows the type of subsonic airflow preferred. See Figure 7.

Skins 30 and 31 are spaced apart and held together or in place by the rather thick rib plates 16 and 17, and they may be spaced at intervals along the wing span and extend the entire length of the wing chord. The rib plates 16 and 17 are also formed in a slightly lenticular shape but are set within the wing vertically. The rib plates 16 and 17 are connected to the lower stationary hinge post 14 and to the inner surfaces of skins 30 and 31. The preceding described parts may be riveted, bolted, or may be glued together by the Shell Oil Company process, i.e., bonded with an epoxy resin.

The rib plates 16 and 17, being formed lenticularly and installed vertically between the skins 30 and 31, and all operating mechanisms, levers, hydraulic jacks, and actuating rods and clevis, are located approximately within the confines formed by rib plates 16 and 17 away from the internal high density airflow.

The hinge post consists of two parts 14 and 11 and are hinged together by pin 15. The hinge post is pointed to a very sharp leading edge at the front so as to offer as little resistance as possible to the entering airflow. See Figure 6. The lower hinge post part 14 is attached to the forward edge of rib plates 16 and 17 and to the forward inner surface of skin 31, and is faired in to form a smooth joint, so as not to offer resistance to the internal airflow.

The upper post part 11 is attached to the lower forward surface of slat 10 and forms a strong hinge. Lever 31 is connected to the aft inner surface of slat 10. Lever 31 is constituted of two parts, and the upper end of the slotted lever 12 is held between them by pin 32. The lower end of the lever 12 is located within the confines of ribs 16 and 17 by pin 13.

The aft internal flaps 23 and 24 may be constructed and formed from solid material or as in Figures 4 and 5 are hollow to save weight, and are hinged to the inner surface of skin 30 and 31, respectively, and the ends are butted, with operating clearance, to the rib plates 16 and 17. There may be a slight leakage of the internal airflow when the internal flaps 23 and 24 are partly closed or closed completely, between the ends of flaps 23 and 24 and rib plates 16 and 17. Similarly for the single internal flap 44. The internal flaps 23 and 24 are connected to levers 21 and 22 by pins 38 and 37, respectively, with curved slots in the respective rib plates 16 and 17 for freedom of movement for pins 38 and 37.

Hydraulic jack 39 is located and connected within the confines formed by rib plates 16 and 17, and is connected by pin 40 thereto. Force is applied to the hydraulic jack by a hydraulic system from within the cockpit (not shown) by the pilot and force is transmitted to rod 29 in turn force is transmitted to lever 19; which in turn actuates rods 18 and 20. Rod 18 pulls slat 10 aft through the levers 12 and 31 and the slat is closed to form a faired in joint with skin 30, with the joint set at an angle, so when closed, there is little discontinuity of the upper surface as possible. Force is also transmitted aft through rod 20 to levers 21 and 22, which in turn transmits force to hinge pins 38 and 37, to open the internal flaps to allow the internal airflow to flow out the somewhat smaller aft opening.

Figure 2:
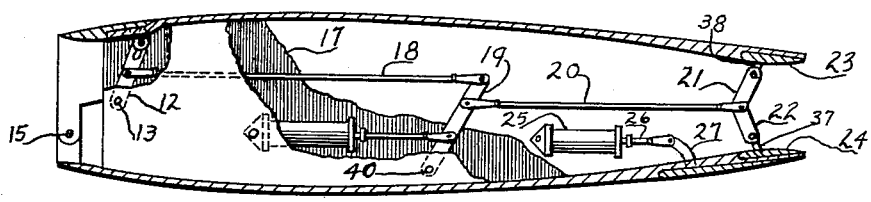
Figure 2 is a cross-sectional view of the device with the slat and two internal flaps and the lower external flap and operating mechanisms in the high velocity flow position. This is for supersonic flights.

Hydraulic force is also applied to hydraulic jack 25, which is located within the confines of rib plates 16 and 17 by pin 41, and force is transmitted through rod 26, in turn to lever 27, which is connected to the external flap 43, to close external flap 43, against the lower surface of skin 31, as illustrated by Figure 2. This is for high speed flights. When force is applied in the reverse manner, all moveable high lift devices are actuated as illustrated by Figure 1. This is for landing and initial stages of flight. For the preferred type of airflow, see Figure 7.

Figure 3:
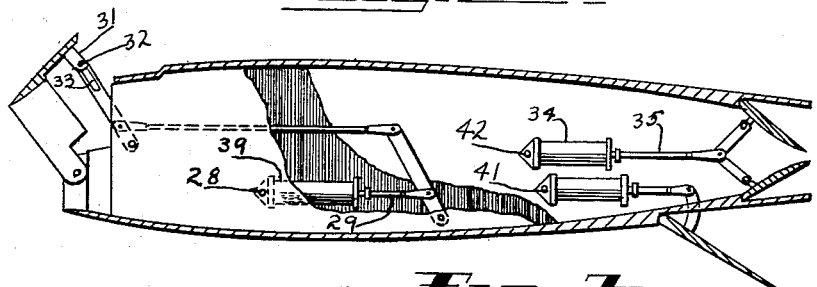
Figure 3 is also a cross-sectional view of the device in the low velocity, high lift position with the slat opened, the two internal flaps partly closed and operated by a different mechanism, with the lower external flap deflected downward and the operating mechanisms in the opposite position.

Due to certain types of flights and aircraft design, there may be the need to separate the operating mechanism from slat 10 and the internal flaps 23 and 24. See Figure 3. Force is applied through hydraulic system (not shown) to hydraulic jack 34, which is also located within the confines of rib plates 16 and 17, by pin 42, force is transmitted to rod 35, in turn actuates levers 21 and 22, on the pins 38 and 37, as illustrated by Figure 3. Rib plates are slotted to allow the pins 38 and 37 to actuate the internal flaps 23 and 24. The slots are not shown. The single flap 44 is similarly constructed, see Figure 5 and the levers and slots are not shown.

The boundary layer control devices, as illustrated by Figure 10, have been previously used and are applicable on the present invention without the need for pumping equipment; thereby a saving in weight, and energy to operate the pumping mechanisms. As the airflow is rammed through the forward opening and the airflow is somewhat restricted by the inner aft slopes and there is an increased density in the somewhat retarded airflow. As the density is somewhat greater than the boundary layer on the aft slopes, part of the high density airflow is forced through out the slots 45 at high rate of velocity against the boundary layer next to the airfoil skins 30 and 31. As the ejected air mass is becoming stagnated, the next airflow ejected from the following slot moves the previous ejected airflow from the forward slot further away from the airfoil, etc.

I claim:

1. In an airfoil body, an upper skin of slightly convex shape upwardly, a lower skin of slightly convex shape downwardly spaced from said upper skin and forming an opening between the forward edges thereof and forming a smaller opening between the trailing edges thereof, pairs of ribs between said skins spaced along the length thereof and extending across the full chord of said skins, said upper skin terminating in a forward line short of a line vertically above the forward edge of said lower skin, a movable slat normally faired into said upper skin terminating in a line vertically above the forward edge of said lower skin, hinge means for said slat faired into the forward edges of said ribs, said hinge means including a pivot connecting said slat to said ribs, hydraulically actuated means for rotating said slat about said pivot, an upper inner airfoil pivoted to and normally faired into the lower aft surface of said upper skin, a lower inner airfoil pivoted to and normally faired into the upper aft surface of said lower skin, hydraulically actuated means for rotating said inner airfoils on their respective pivots, an external airfoil pivoted to and normally faired into the outer aft surface of said lower skin, hydraulically actuated means for rotating said external airfoil on its pivot, said pivot for said external airfoil being forward of the pivots of said inner airfoils, said hydraulically actuated means being mounted between pairs of said ribs between said skins, whereby when said slat is rotated away from said upper skin, when said inner airfoils are rotated toward each other, and when said external airfoil is rotated away from said lower skin the airfoil body has high lift low velocity characteristics.

2. In an airfoil body, an upper skin of slightly convex shape upwardly, a lower skin of slightly convex shape downwardly spaced from said upper skin and forming an opening between the forward edges thereof and forming a smaller opening between the trailing edges thereof, pairs of ribs between said skins spaced along the length thereof and extending across the full chord of said skins, said upper skin terminating in a forward line short of a line vertically above the forward edge of said lower skin, a movable slat normally faired into said upper skin and terminating in a line vertically above the forward edge of said lower skin, hinge means for said slat faired into the forward edges of said ribs, said hinge means including a pivot connecting said slat to said ribs, hydraulically actuated means for rotating said slat about said pivot, an inner airfoil pivoted to and normally faired into the upper aft surface of said lower skin, hydraulically actuated means for rotating said inner airfoil on its pivot, an external airfoil pivoted to and normally faired into the outer aft surface of said lower skin, hydraulically actuated means for rotating said external airfoil on its pivot, said pivot for said external airfoil being forward of the pivot for said inner airfoil, said hydraulically actuated means being mounted between pairs of said ribs between said skins, whereby when said slat is rotated away from said upper skin, when said inner airfoil is rotated to close the opening between the trailing edges of said skins, and when said external airfoil is rotated away from said lower skin the airfoil body has high lift low velocity characteristics.

3. In an airfoil body, an upper skin of slightly convex shape upwardly, a lower skin of slightly convex shape downwardly spaced from said upper skin and forming an opening between the forward edges thereof and forming a smaller opening between the trailing edges thereof, pairs of ribs between said skins spaced along the length thereof and extending across the full chord of said skins, said upper skin terminating in a forward line short of a line vertically above the forward edge of said lower skin, a movable slat normally faired into said upper skin and terminating in a line vertically above the forward edge of said lower skin, hinge means for said slat faired into the forward edges of said ribs, said hinge means including a pivot connecting said slat to said ribs, hydraulically actuated means for rotating said slat about said pivot, at least one airfoil means pivoted to and normally faired into at least one of the inner surfaces of said skins adjacent the smaller opening, hydraulically actuated means for rotating said airfoil means, an external airfoil pivoted to and normally faired into the outer aft surface of said lower skin, hydraulically actuated means for rotating said external airfoil on its pivot, said pivot for said external airfoil being forward of the pivot of said airfoil means, said hydraulically actuated means being mounted between pairs of said ribs and between said skins, whereby when said slat is rotated away from said upper skin, when said airfoil means is rotated to close the smaller opening, and when said external airfoil is rotated away from said lower skin the airfoil body has high lift low velocity characteristics.

References Cited in the file of this patent

UNITED STATES PATENTS

| | | |
|---|---|---|
| 1,559,091 | Hall | Oct. 27, 1925 |
| 1,780,838 | Page | Nov. 4, 1930 |
| 1,810,693 | Alfaro | June 16, 1931 |
| 2,147,360 | Zaparka | Feb. 14, 1939 |
| 2,267,927 | Kightlinger | Dec. 30, 1941 |
| 2,486,967 | Morrison | Nov. 1, 1949 |

FOREIGN PATENTS

| | | |
|---|---|---|
| 782,482 | France | Mar. 18, 1935 |